UNITED STATES PATENT OFFICE.

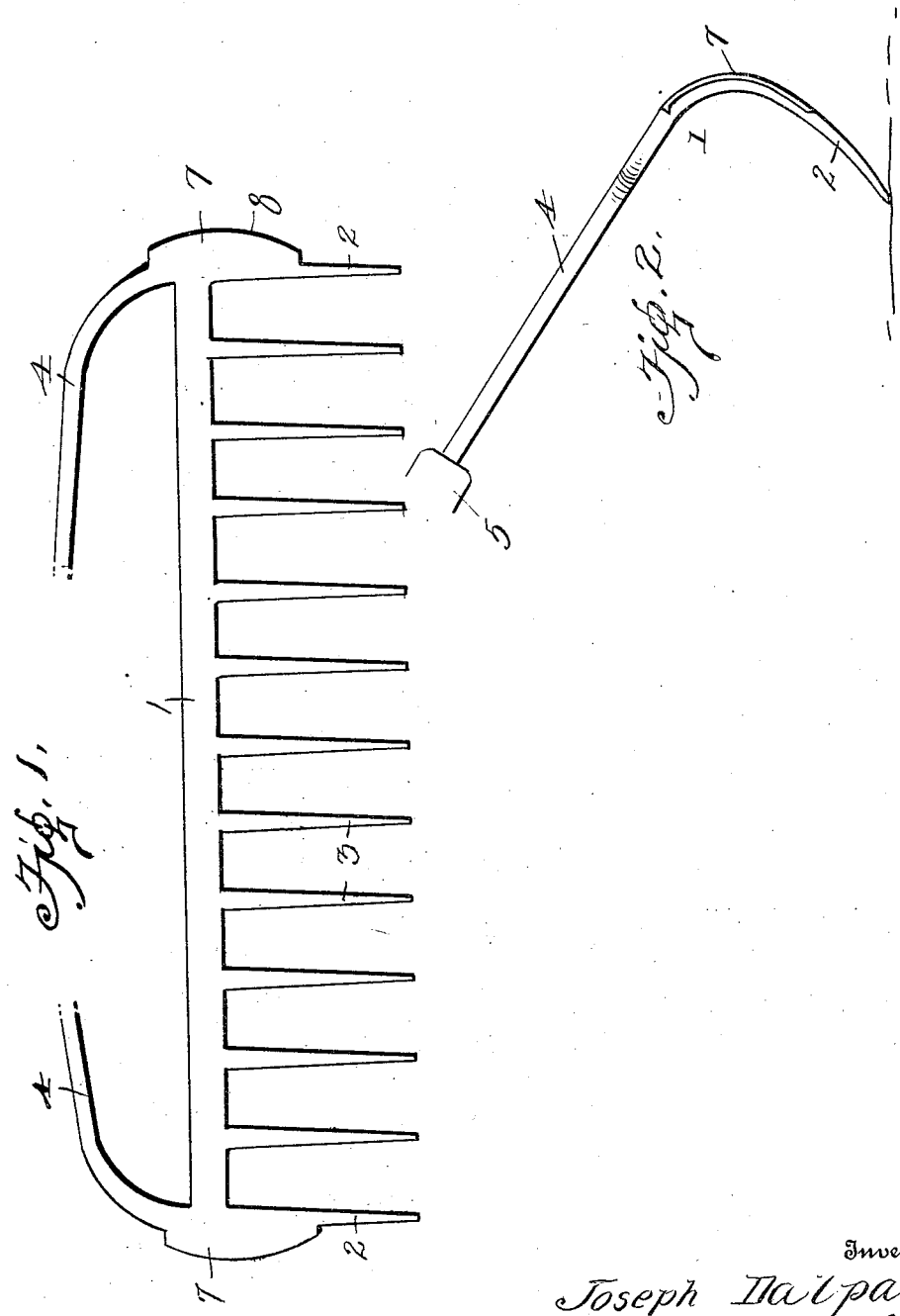

JOSEPH DALPAY, OF SEATTLE, WASHINGTON.

COMBINED RAKE AND HOE.

954,616.  Specification of Letters Patent. Patented Apr. 12, 1910.

Application filed December 4, 1909. Serial No. 531,320.

*To all whom it may concern:*

Be it known that I, JOSEPH DALPAY, a citizen of the United States, residing at Seattle, in the county of King and State of Washington, have invented new and useful Improvements in Combined Rakes and Hoes, of which the following is a specification.

This invention relates to a combined rake and hoe, and has for an object to provide a device of this character wherein the hoe is formed as an integral part of the rake, it being located preferably at one end thereof and connected with the end tooth and with the end portion of the head.

The above mentioned and other objects are attained by the construction, combination and arrangement of parts, as disclosed on the drawing, set forth in this specification, and particularly pointed out in the appended claims.

In the drawing, forming a portion of this specification and in which like numerals of reference indicate similar parts in the several views:—Figure 1 is a detail front elevation of my improved rake. Fig. 2 is a detail side elevation thereof.

The rake shown in Figs. 1 and 2 of the drawing consists of a head 1 which is formed with end teeth 2 and with intermediate teeth 3. The head 1 has formed integrally therewith a pair of upwardly and rearwardly directed arms 4 whose terminal ends are secured in the ferrule 5 of a handle. The end teeth are connected with the head 1 and with the arms 4 by hoe blades 7 each of which being provided with an arcuate cutting edge 8. The construction is such that the hoe blade as formed is greatly reinforced incident to its being formed integral with the end tooth and with the arm 4. The end tooth and the arm 4 are also braced and reinforced by the provision of the hoe.

I claim:—

1. An implement of the class described embodying a toothed head, arms formed integrally with the head and extending rearwardly and upwardly therefrom, a handle engaged with the arms, and blades connecting the end teeth of the head with the arms.

2. An implement of the class described comprising a head, a plurality of teeth extending therefrom, arms extending from the head, a handle connected with the arms, and blades formed integrally with the arms and with the end teeth of the head, the said blades extending outwardly from the ends of the head and provided with curved cutting edges.

In testimony whereof I affix my signature in presence of two witnesses.

JOSEPH DALPAY.

Witnesses:
TOM ALDERSON,
O. E. WALLER.